(12) United States Patent
Lin et al.

(10) Patent No.: US 7,888,989 B2
(45) Date of Patent: Feb. 15, 2011

(54) CHARGE PUMP REGULATOR AND METHOD OF PRODUCING A REGULATED VOLTAGE

(75) Inventors: Shui-Mu Lin, Longjing Township, Taichung County (TW); Tsung-Wei Huang, Jubei (TW); Jien-Sheng Chen, Toufen Township, Miaoli County (TW)

(73) Assignee: Richtek Technology Corp., Hsinchu (TW)

( * ) Notice: Subject to any disclaimer, the term of this patent is extended or adjusted under 35 U.S.C. 154(b) by 324 days.

(21) Appl. No.: 12/068,040

(22) Filed: Feb. 1, 2008

(65) Prior Publication Data
US 2008/0197898 A1 Aug. 21, 2008

(30) Foreign Application Priority Data
Feb. 16, 2007 (TW) ............................... 96106017 A (51) Int. Cl.
*G05F 1/10* (2006.01)

(52) U.S. Cl. ...................................... 327/536; 327/535
(58) Field of Classification Search ................ 327/535, 327/536, 540; 363/59, 60
See application file for complete search history.

(56) References Cited

U.S. PATENT DOCUMENTS

| | | | | |
|---|---|---|---|---|
| 5,680,300 A | * | 10/1997 | Szepesi et al. | ................. 363/59 |
| 6,650,555 B2 | * | 11/2003 | Suzuki et al. | ................. 363/60 |
| 7,511,561 B2 | * | 3/2009 | Nagatomo et al. | .......... 327/536 |

* cited by examiner

*Primary Examiner*—Long Nguyen
(74) *Attorney, Agent, or Firm*—Rosenberg, Klein & Lee (57) ABSTRACT

A charge pump regulator has a charge pump to establish a charge path and a discharge path alternately, so as to produce a regulated voltage on an output terminal. The charge pump has at least a current control element on the charge path or the discharge path to control the current flowing therethrough according to an output-dependent feedback signal.

11 Claims, 11 Drawing Sheets

CHARGE PUMP REGULATOR AND METHOD OF PRODUCING A REGULATED VOLTAGE

FIELD OF THE INVENTION

The present invention is related generally to a charge pump regulator and, more particularly, to a high current charge pump regulator.

BACKGROUND OF THE INVENTION

As described in U.S. Pat. No. 6,411,531 to Nork et al., a pulse frequency modulation (PFM) charge pump regulator comprises a switch-capacitor network as a charge pump, in which switches are switched with a modulated switching frequency according to an output-dependent feedback signal, to connect a capacitor to a power supply or to an output terminal in order to charge and discharge the capacitor, so as to produce a regulated voltage on the output terminal. Such circuit will cause large input ripple and thereby large supply voltage disturbance, and induce undesired low frequency noise subsequently. It is not easy to process this low frequency noise, and very large and expansive filter is required to filter out the low frequency noise.

U.S. Pat. No. 6,411,531 to Nork et al. also described another charge pump regulator which has switches in a charge pump switched with a constant switching frequency, and a variable resistor inserted between the charge pump and a ground terminal to be controlled by an output-dependent feedback signal to vary the resistance thereof. This variable resistor limits the charge current to the capacitor in the charge pump and reduces the input current ripple. However, the current ripple in the discharge phase is still large. Because of the smaller input current in the charge phase, this circuit will cause smaller supply voltage disturbance. However, in the range of low frequency, for example the switching frequency, the supply voltage disturbance caused by the input current ripple is still large. The large input current ripple also causes high frequency noise during the blank period which has all the switches in the charge pump open.

U.S. Pat. No. 6,411,531 to Nork et al. proposed an improved charge pump regulator, which also operates with a constant switching frequency, but has a variable resistor inserted between the power supply and the input terminal of the charge pump. The resistance of the variable resistor is varied according to an output-dependent feedback signal in order to control the input current in each phase, so as to reduce the supply voltage disturbance that causes low frequency noise. However, the input series resistance is so increased, and thereby the power consumption is increased, resulting in decreased efficiency of the charge pump regulator.

Texas Instruments (TI) incorporated provides a product with serial no. TPS6500, which inserts a current source between the power supply and the input terminal of the charge pump for providing a stable input current, so as to reduce the input ripple. However, this current source is still an added element outside the charge pump.

SUMMARY OF THE INVENTION

One object of the present invention is to provide a low open loop resistance charge pump regulator.

Another object of the present invention is to provide a high efficiency charge pump regulator.

Yet another object of the present invention is to provide a low ripple, high current charge pump regulator.

Still another object of the present invention is to provide a high current-capacity charge pump regulator.

Yet still another object of the present invention is to provide a low high-frequency noise charge pump regulator.

A further object of the present invention is to provide a small chip-size charge pump regulator.

Still a further object of the present invention is to provide a method of producing a regulated voltage.

A charge pump regulator according to the present invention comprises a charge pump connected between an input terminal and an output terminal, and a feedback loop to produce an output-dependent feedback signal for the charge pump. The charge pump is operative to establish a charge path and a discharge path alternately, and has at least a current control element on the charge path or the discharge path to control a current flowing therethrough according to the output-dependent feedback signal. The output-dependent feedback signal may be produced from the output terminal or a load-current.

The current control element controls the charge current or the discharge current of a capacitor in the charge pump, thereby reducing the input ripple.

The current control element may replace the switch on the charge path or the discharge path, thereby requiring no extra element, and therefore the circuit needs smaller chip size.

No extra series resistance is added between the power supply and the charge pump, or between the charge pump and ground terminal, thereby reducing the power consumption and improving the efficiency subsequently.

The current control element is preferably a voltage-controlled power source, such as voltage-controlled voltage source and voltage-controlled current source.

Preferably, the charge pump regulator further comprises a wide bandwidth, high slew rate buffer for driving the current control element according to the output-dependent feedback signal, so as to reduce high frequency noise.

The charge pump may be operative with a constant switching frequency, to thereby reduce the input ripple and the output ripple.

Preferably, multi-phase non-overlapping clocks are used for the charge pump to be switched between charge and discharge phases, so as to avoid shoot-through.

According to the present invention, a method of producing a regulated voltage comprises operating a charge pump for establishing a charge path and a discharge path alternately, and producing an output-dependent feedback signal to further produce a drive signal. The charge pump has at least a current control element on the charge path or the discharge path to be driven by the drive signal to control the current flowing therethrough.

BRIEF DESCRIPTION OF DRAWINGS

These and other objects, features and advantages of the present invention will become apparent to those skilled in the art upon consideration of the following description of the preferred embodiments according to the present invention taken in conjunction with the accompanying drawings, in which.

DETAILED DESCRIPTION OF THE INVENTION

Figure 1:
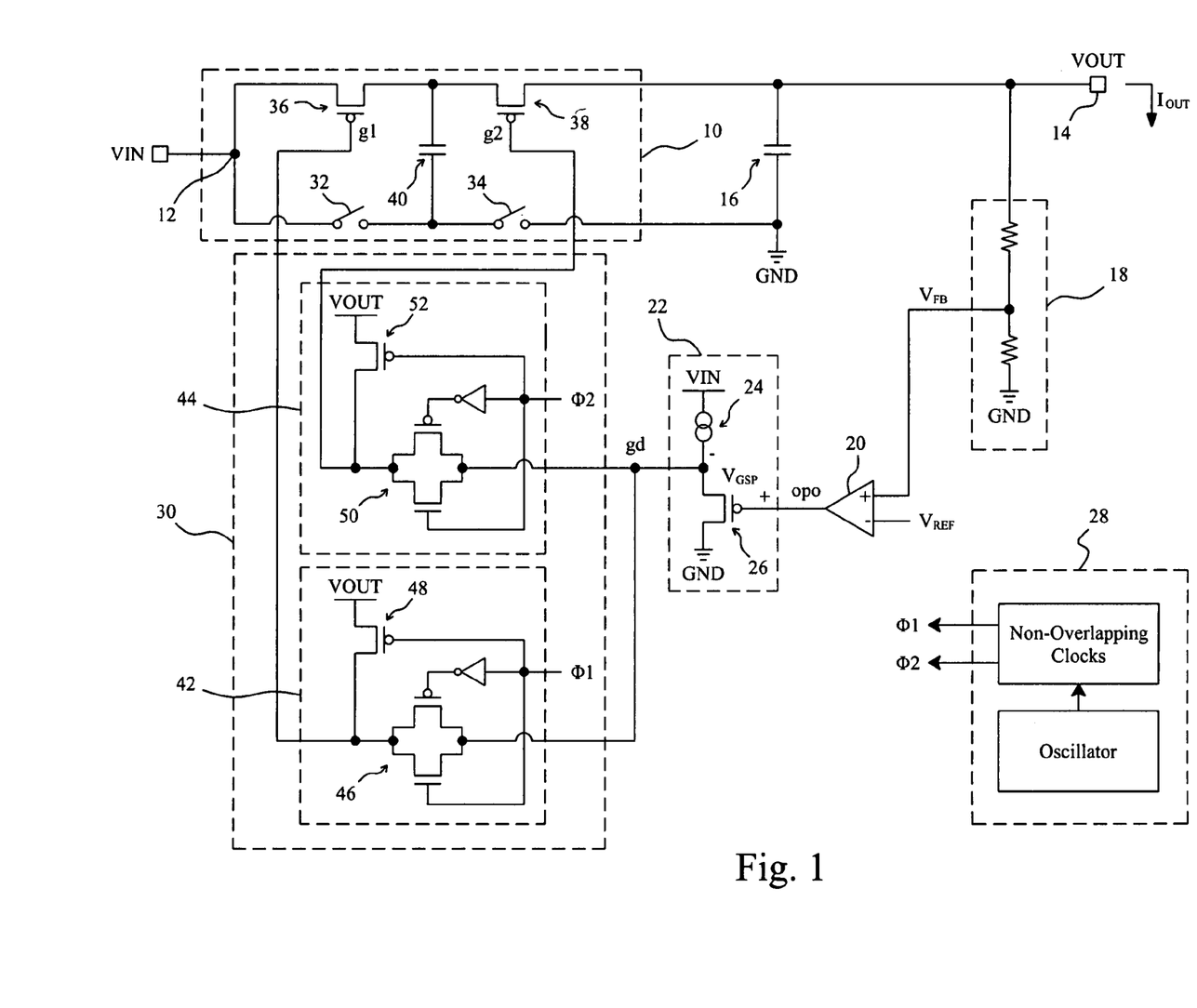
FIG. 1 shows a first embodiment according to the present invention.

FIG. 1 shows a x1/x2 boost-type charge pump regulator, which comprises a charge pump 10 connected between an input terminal 12 and an output terminal 14, an output capacitor 16 connected between the output terminal 14 and a ground terminal GND, and other control circuits to control the charge pump 10. A feedback loop comprises a resistor voltage divider 18 to produce a proportional voltage $V_{FB}$ from the output terminal 14 by dividing the output voltage VOUT thereon, and an amplifier 20 to amplify the difference between the proportional voltage $V_{FB}$ and a reference voltage $V_{RFE}$ to produce an output-dependent feedback signal opo. A buffer 22 is used to produce a drive signal gd according to the feedback signal opo. In this embodiment, the buffer 22 comprises a current source 24 and a PMOS transistor 26 connected in series between a power input VIN and a ground terminal GND, the gate of the PMOS transistor 26 is connected with the output-dependent feedback signal opo, and the drive signal gd is drawn from the source of the PMOS transistor 26. A clock generator 28 provides multi-phase non-overlapping clocks Φ1 and Φ2 for the charge pump 10 and a connector 30. The charge pump 10 comprises two switches 32 and 34, two current control elements 36 and 38, and a capacitor 40. The switches 32 and 34 may be implemented with PMOS transistor or NMOS transistor, and are switched by the clocks Φ1 and Φ2 respectively, only for establishing or disconnecting a conductive path. Each of the current control elements 36 and 38 comprises a voltage-controlled voltage source (VCVS) or a voltage-controlled current source (VCCS) for controlling the current flowing therethrough. In this embodiment, they are implemented with PMOS transistor operative in a linear region, and their drive signals g1 and g2 are provided by two connection units 42 and 44 in the connector 30 respectively. The connection unit 42 comprises a transmission gate 46 for connecting the drive signal gd to the gate of the PMOS transistor 36 in the phase Φ1, and a switch 48 for pulling high the drive signal g1 to VOUT when not in the phase Φ1. Briefly, in the phase Φ1, the PMOS transistor 36 and the switch 34 are turned on so as to establish a charge path such that the power supply VIN connected to the input terminal 12 may charge the capacitor 40; in the phase Φ2, the PMOS transistor 38 and the switch 32 are turned on so as to establish a discharge path such that the capacitor 40 will discharge to the output terminal 14. As such, by alternately establishing the charge path and the discharge path in the charge pump 10, the voltage VOUT on the output terminal 14 is regulated.

Figure 2:
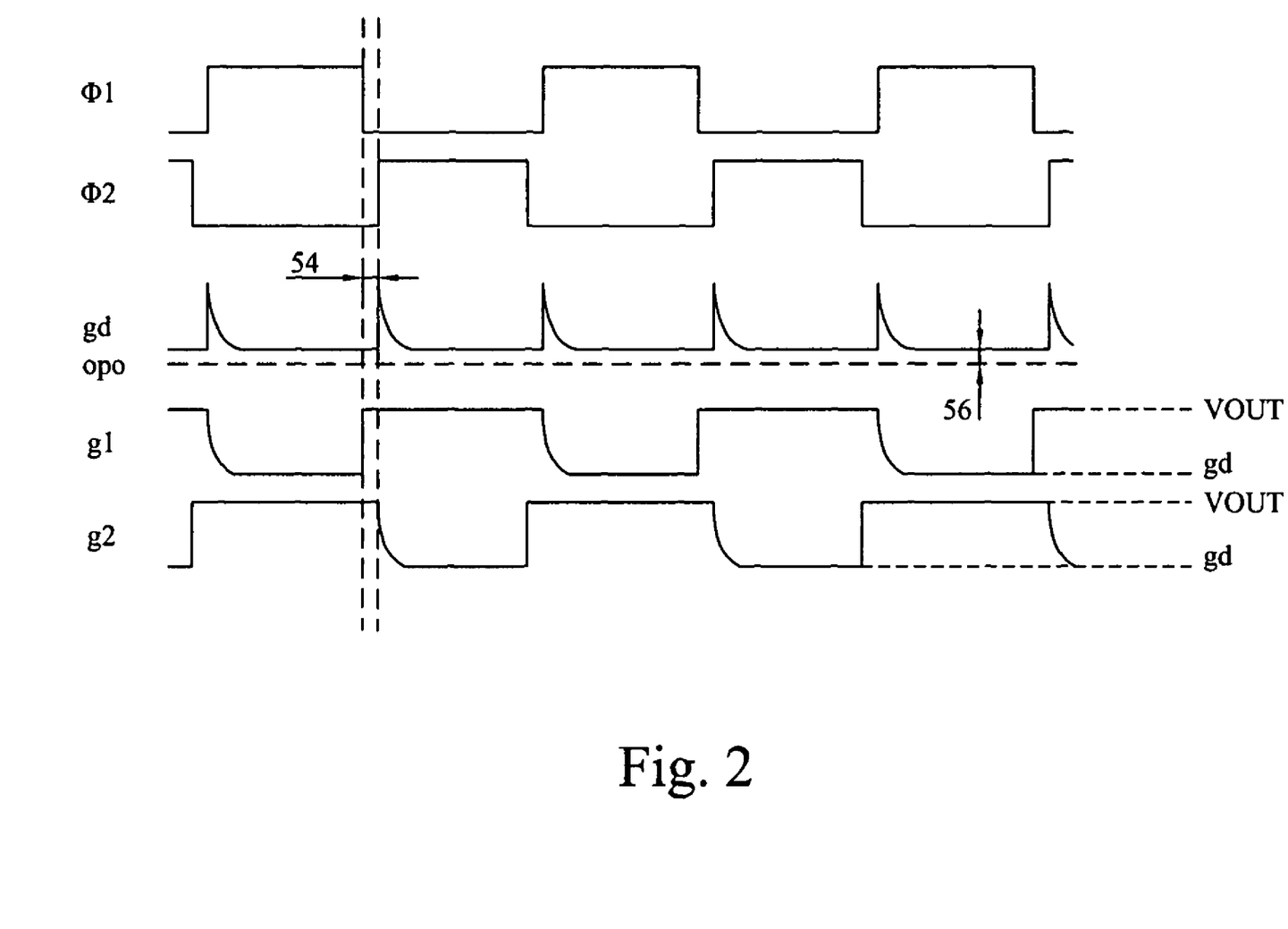
FIG. 2 is a waveform diagram showing the drive signals used in the circuit of FIG. 1.

FIG. 2 is a waveform diagram showing the drive signals g1 and g2, in which the multi-phase non-overlapping clocks Φ1 and Φ2 have a non-overlapping period 54 between the phases Φ1 and Φ2, so that the switches 32 and 34 will not be turned on at the same time, and also the PMOS transistors 36 and 38 will not be turned on at the same time, to avoid shoot-through.

In this embodiment, because of the PMOS transistor 26 in the buffer 22, the drive signal gd will be higher than the output-dependent feedback signal opo by a gate-source voltage ($V_{GSP}$) 56 of the PMOS transistor 26. The current source 24 in the buffer 22 is used for preventing the source of the PMOS transistor 26 from connecting to the ground terminal GND. In the connector 30, when the clock Φ1 is high, the transmission gate 46 is turned on, the drive signal gd is connected to the gate of the PMOS transistor 36, the drive signal g1 is thus equal to the drive signal gd, and the PMOS transistor 36 on the charge path controls the charge current to the capacitor 40 according to the drive signal gd. In this charge phase Φ1, the clock Φ2 is low, the transmission gate 50 is turned off, thereby cutting off the path connecting the drive signal gd to the PMOS transistor 38, and the switch 52 is turned on to remain the drive signal g2 at VOUT so as to turn off the PMOS transistor 38. On the contrary, in the discharge phase Φ2, the transmission gate 50 is turned on, thereby connecting the drive signal gd to the gate of the PMOS transistor 38 to control the discharge current from the capacitor 40, the transmission gate 46 is turned off, thereby cutting off the path connecting the drive signal gd to the PMOS transistor 36, and the switch 48 is turned on to remain the drive signal g1 at VOUT so as to turn off the PMOS transistor 36.

Figure 3:
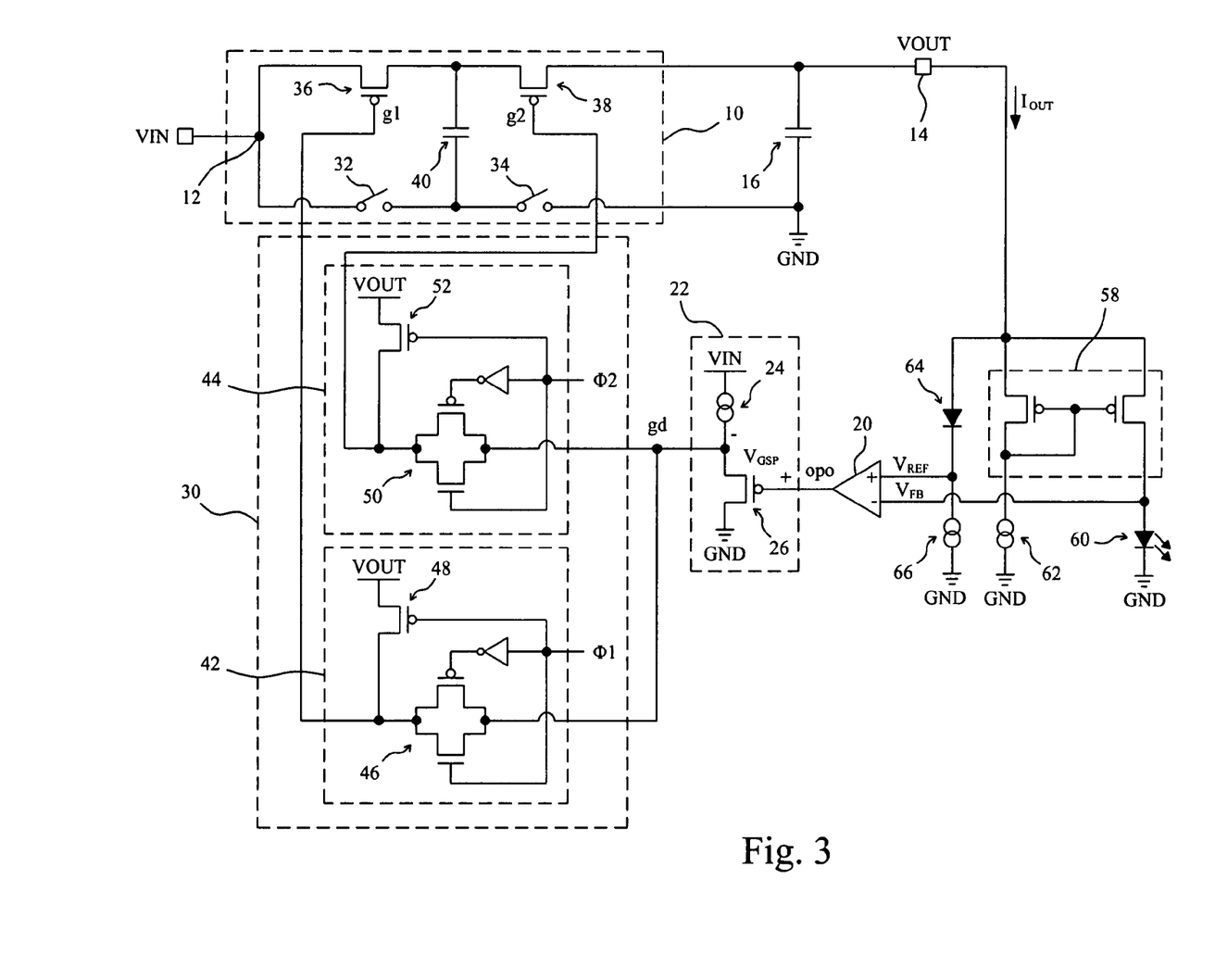
FIG. 3 shows a second embodiment according to the present invention.

FIG. 3 is an alternative embodiment, which is the same as the regulator of FIG. 1 except that the output-dependent feedback signal opo is produced from a load-current $I_{OUT}$. The feedback loop in this embodiment produces a proportional voltage $V_{FB}$ from the load current $I_{OUT}$, and the proportional voltage $V_{FB}$ is compared with a reference $V_{REF}$ by an amplifier 20 to produce the output-dependent feedback signal opo. For producing the proportional voltage $V_{FB}$, a current mirror 58 is used to mirror the load current $I_{OUT}$ for a load 60. In this embodiment, the load 60 is a light-emitting diode (LED) 60 as an example, and the proportional voltage $V_{FB}$ is drawn from the output terminal of the current mirror 58. The reference branch of the current mirror 58 is connected to a current source 62 for preventing it from floating. Because the proportional voltage $V_{FB}$ is the one across the LED 60, it will be dependent on the load current $I_{OUT}$. For producing the reference voltage $V_{REF}$, a diode 64 and a current source 66 are connected in series between the output terminal 14 and a ground terminal GND. The current source 66 prevents the diode 64 from floating. The reference voltage $V_{REF}$ and the output voltage $V_{OUT}$ have a difference therebetween, which is equal to the voltage across the diode 64.

Figure 4:
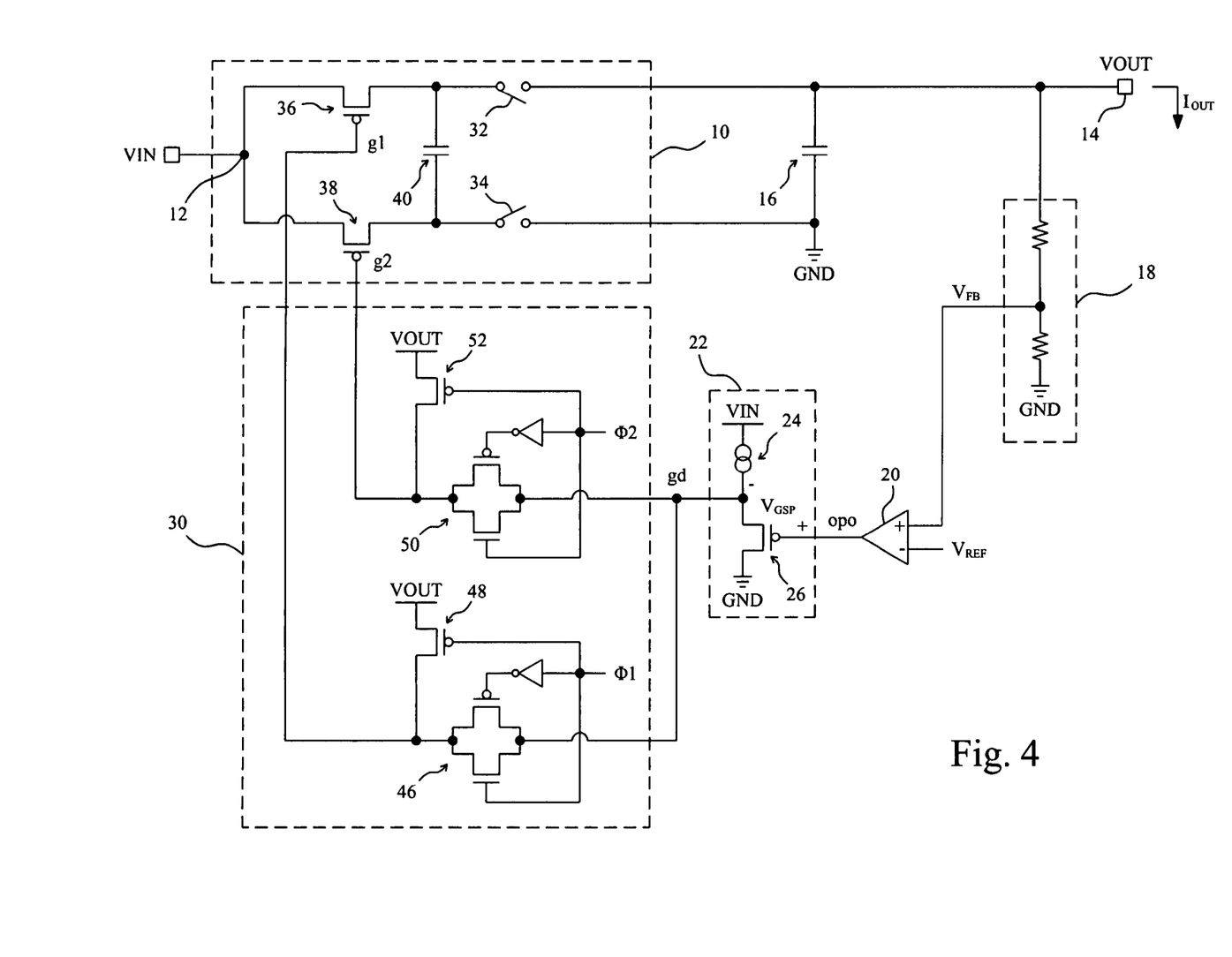
FIG. 4 shows a third embodiment according to the present invention.

FIG. 4 is another embodiment for illustrating that the current control element 36 or 38 may be configured at different position on the same path. As shown in FIG. 4, the current control element 38 and the switch 32 are interchanged with their position on the same path, this charge pump regulator still operates in the same way as that of FIG. 1, and the drive signals g1 and g2 also have the same waveforms as those shown in FIG. 2.

Figure 5:
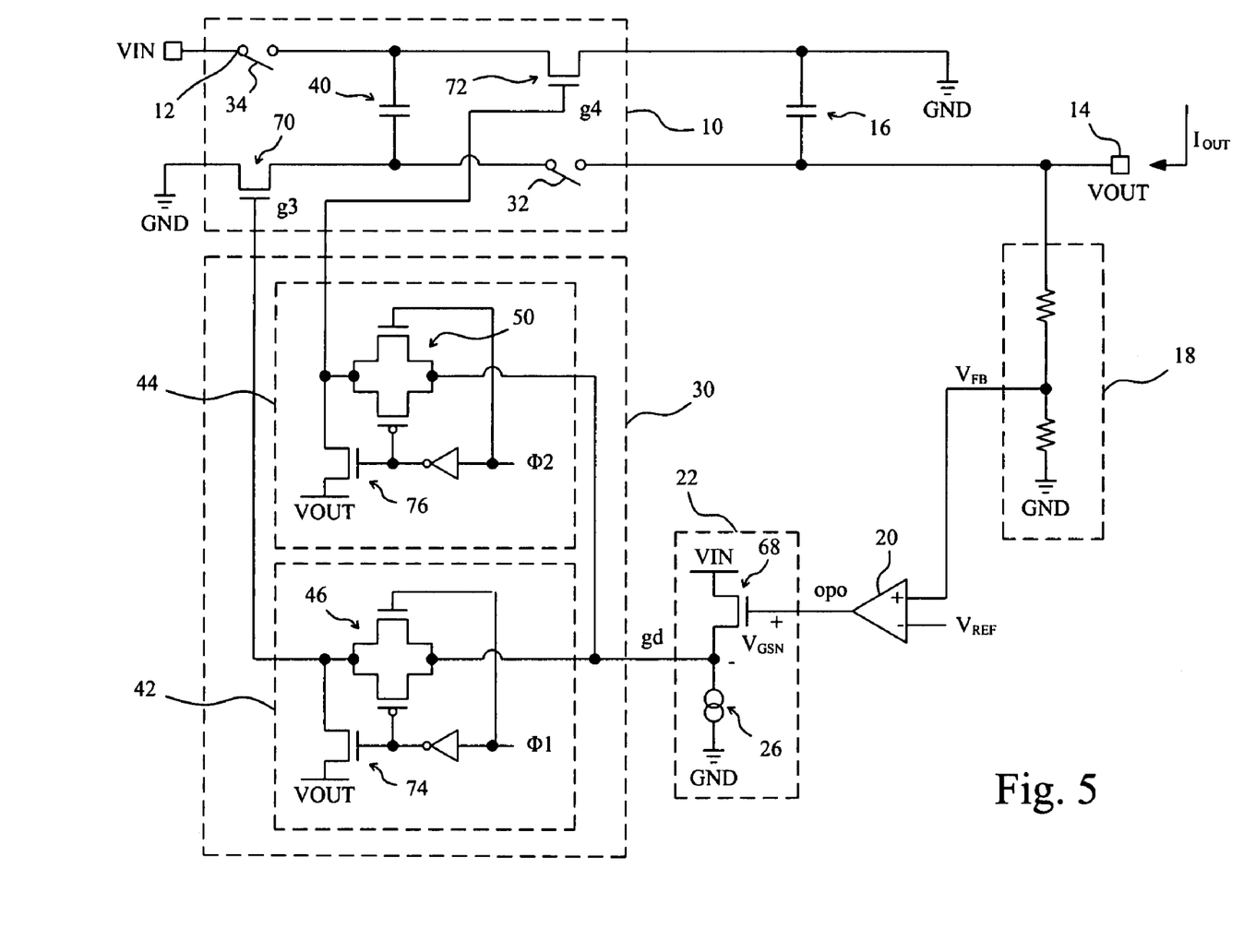
FIG. 5 shows a fourth embodiment according to the present invention.
Figure 6:
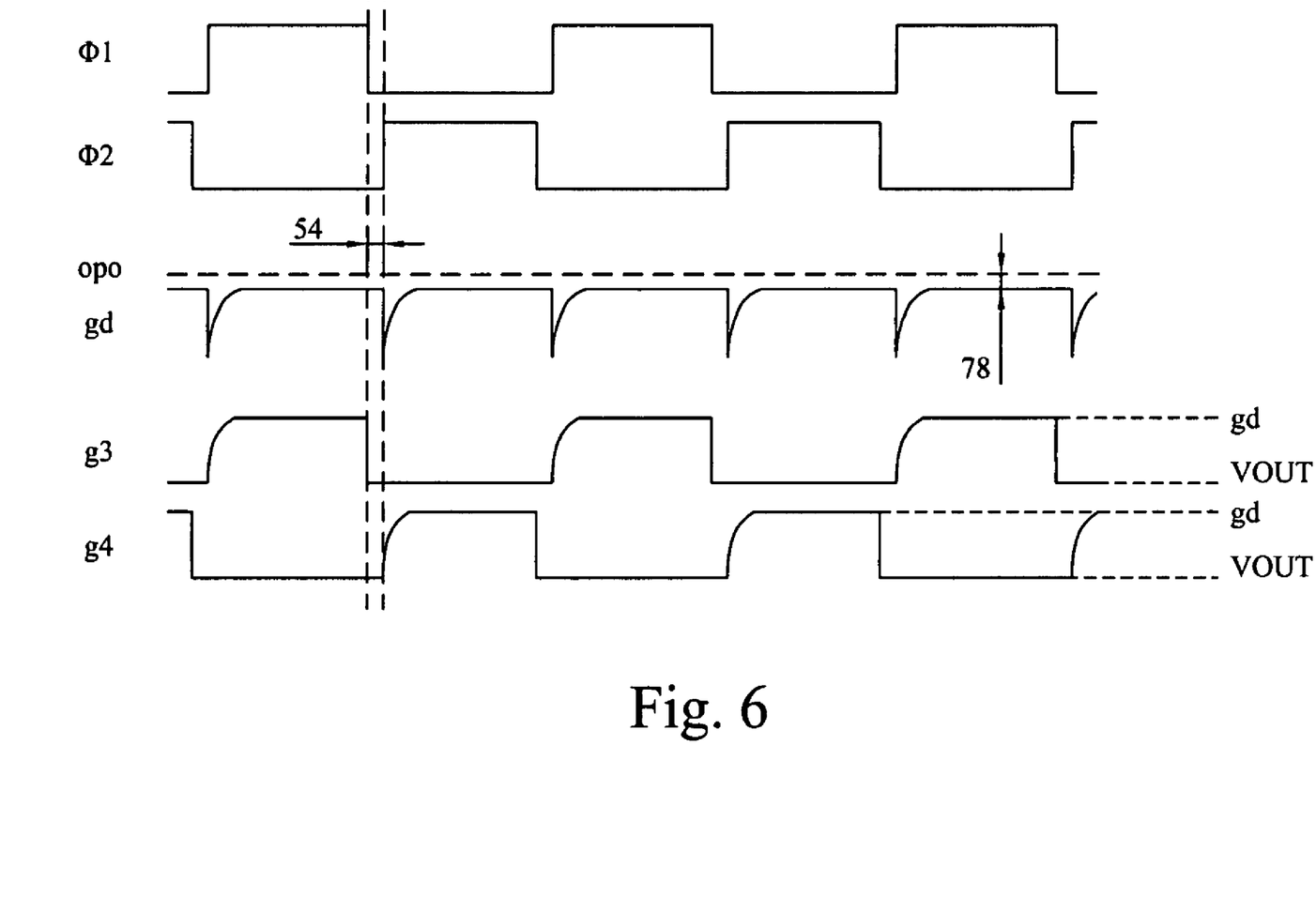
FIG. 6 is a waveform diagram showing the drive signals used in the circuit of FIG. 5.

By changing the element configuration in the charge pump 10, there may be obtained different types of charge pump regulators, for example the x1/x2 inverting boost-type charge pump regulator shown in FIG. 5. In this embodiment, because of the NMOS transistor 68 in the buffer 22, the drive signal gd is lower than the output-dependent feedback signal opo by a gate-source voltage ($V_{GSN}$) of the NMOS transistor 68. The current control elements 70 and 72 are also implemented with NMOS transistors, and are driven by the drive signals g3 and g4 provided by the connection units 42 and 44 respectively. The transmission gate 46 connects the drive signal gd to the gate of the NMOS transistor 70 in the charge phase Φ1, and the switch 74 pulls down the drive signal g3 to VOUT when not in this phase Φ1. The transmission gate 50 connects the drive signal gd to the gate of the NMOS transistor 72 in the discharge phase Φ2, and the switch 76 pulls down the drive signal g4 to VOUT when not in this phase Φ2. The switches 74 and 76 are also implemented with NMOS transistors. The switch 34 and the NMOS transistor 70 are used to establish a charge path for the capacitor 40, and the switch 32 and the NMOS transistor 72 are used to establish a discharge path for the capacitor 40. FIG. 6 is a waveform diagram showing the drive signals g3 and g4 in the charge pump regulator of FIG. 5, in which the voltage 78 represents the gate-source voltage $V_{GSN}$ of the NMOS transistor 68. In the phase Φ1, the switch 34 is turned on by the clock Φ1, the switch 32 is turned off by the clock Φ2, the NMOS transistor 70 is driven by the drive signal gd, the transmission gate 50 cuts off the path connecting the drive signal gd to the NMOS transistor 72, the drive signal g4 prevents the NMOS transistor 72 from being turned on, the power supply VIN connected to the input terminal 12 charges the capacitor 40, and the NMOS transistor 70 controls the charge current. On the contrary, in the phase Φ2, the switch 32 is turned on, the switch 34 is turned off, the NMOS transistor 72 is driven by the drive signal gd, the transmission gate 46 cuts off the path connecting the drive signal gd to the NMOS transistor 70, the drive signal g3 prevents the NMOS transistor 70 from being turned on, the capacitor 40 discharges to the output terminal 14, and the NMOS transistor 72 controls the discharge current.

Figure 7:
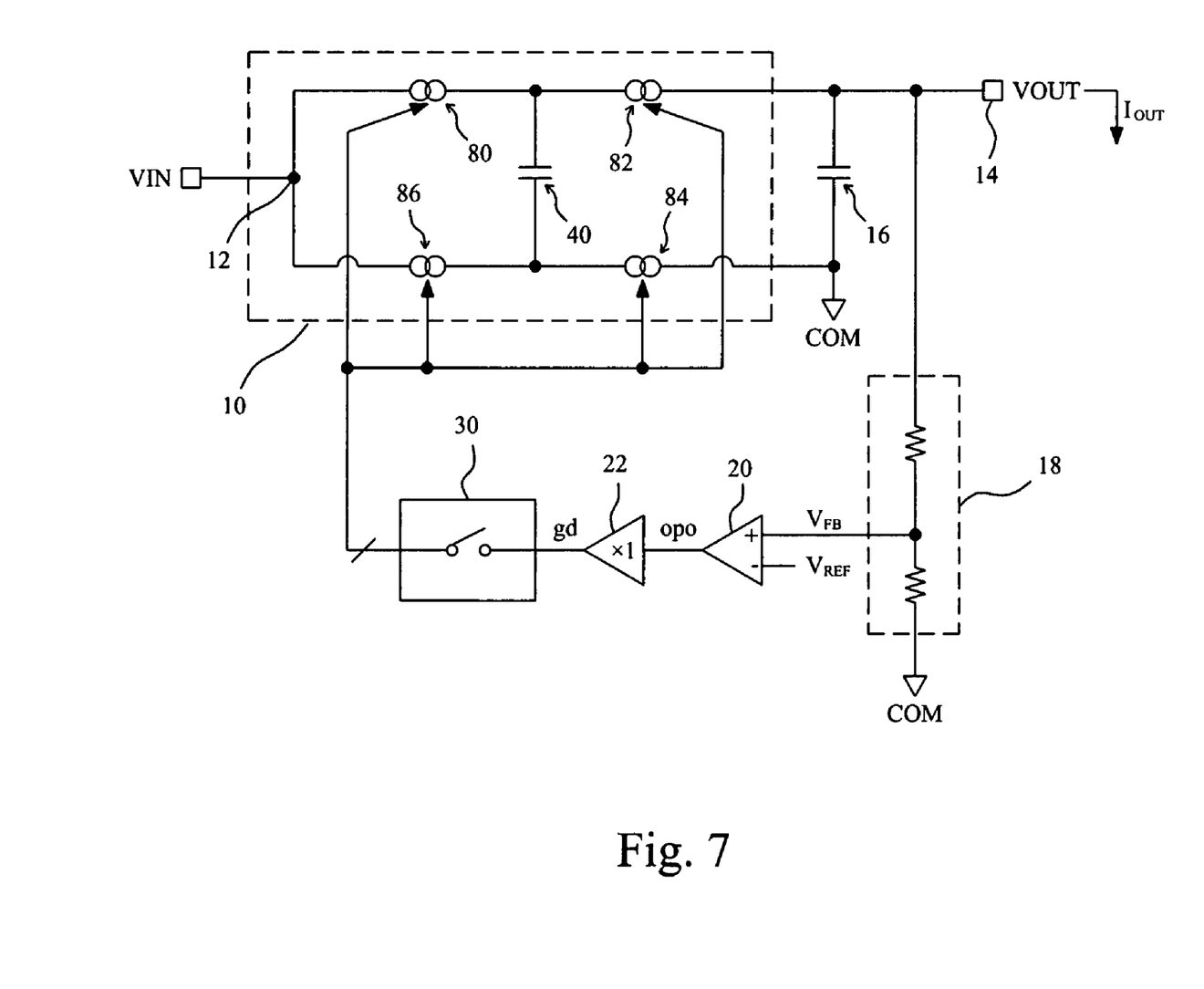
FIG. 7 shows a fifth embodiment according to the present invention.

FIG. 7 shows a x1/x2 boost-type charge pump regulator, which is the same as that of FIG. 1 except that its charge pump 10 employs four voltage-controlled power sources 80, 82, 84 and 86 to replace the switches to establish and disconnect the charge path and the discharge path. The connector 30 connects the drive signal gd to the voltage-controlled power sources 80, 82, 84 and 86 according to the clocks Φ1 and Φ2, to establish the charge path and the discharge path and control the charge current and the discharge current of the capacitor 40.

Figure 8:
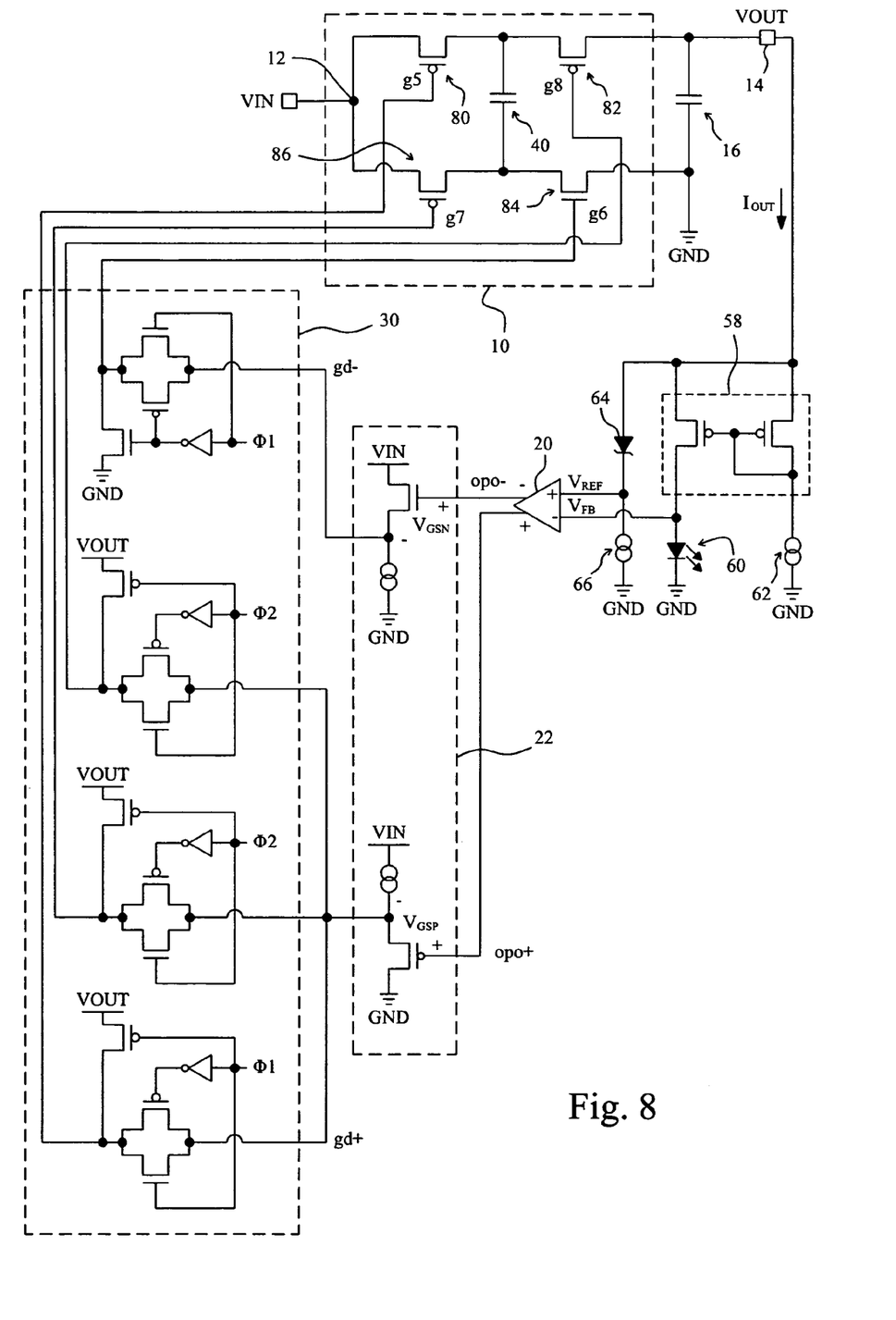
FIG. 8 shows a sixth embodiment according to the present invention.
Figure 9:
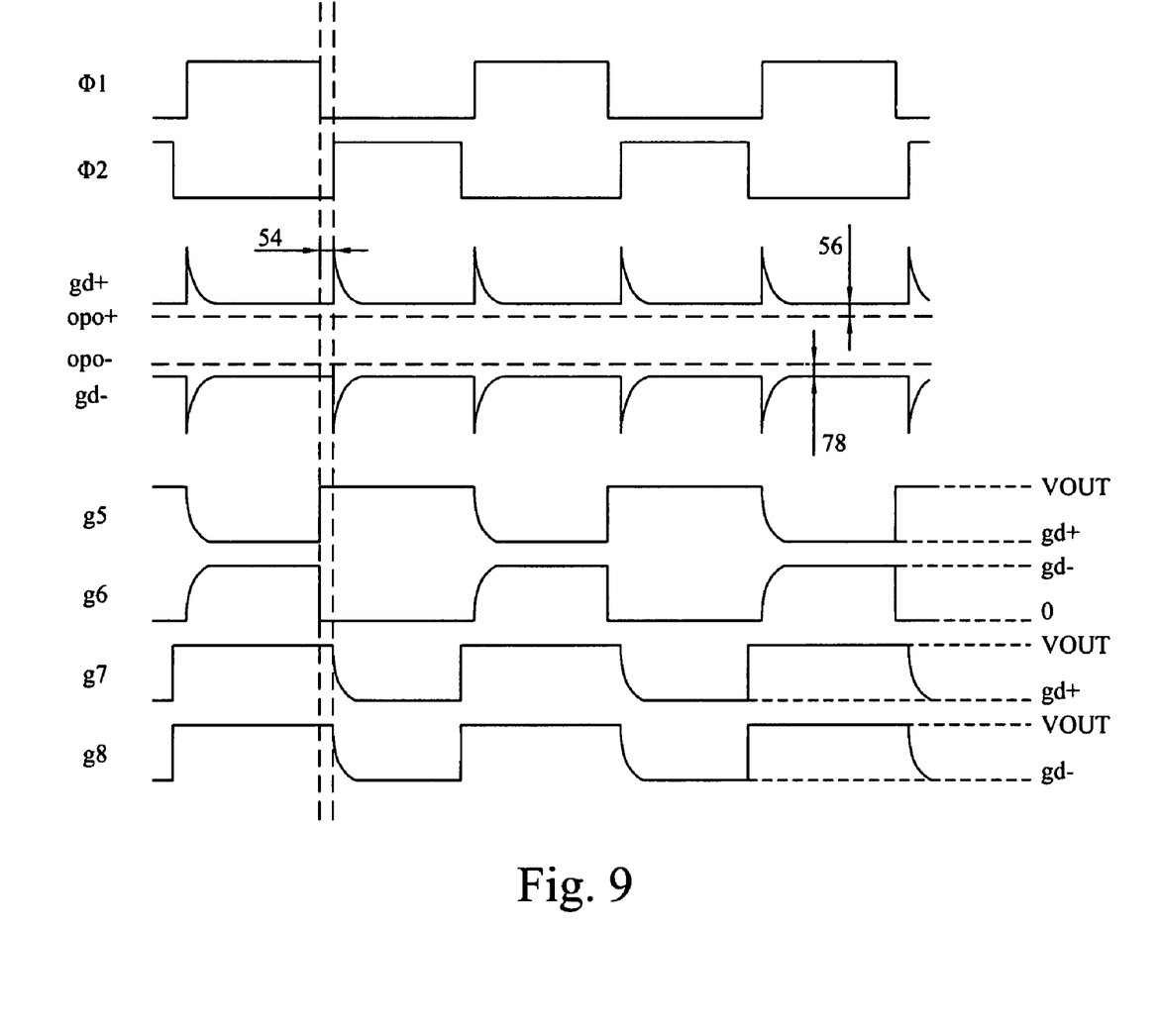
FIG. 9 is a waveform diagram showing the drive signals used in the circuit of FIG. 8.

FIG. 8 shows an alternative to the charge pump regulator of FIG. 7, in which the voltage-controlled power sources 80, 82 and 86 are implemented with PMOS transistors, the voltage-controlled power source 84 is implemented with NMOS transistor, and the feedback loop is the same as that of FIG. 3 to produce the output-dependent feedback signal $V_{FB}$ from the load current $I_{OUT}$. However, for simultaneously producing the drive signals g5, g8, g7 and g6 to control the PMOS transistors 80, 82 and 86 and the NMOS transistor 84 respectively, the amplifier 20 produces a pair of complementary output-dependent feedback signals opo− and opo+ for two units in the buffer 22 to produce two drive signals gd− and gd+ respectively, and four connection units in the connector 30 are used for establishing and cutting off the paths connecting the drive signals gd− and gd+ to the NMOS transistor 84 and the PMOS transistors 80, 82 and 86 respectively. The operations of the internal circuits of the buffer 22 and the connector 30 are the same as the above embodiments and so will not be reiterated herein. The drive signals g5 to g8 in this charge pump regulator are shown in FIG. 9, in which the drive signal gd+ is higher than the output-dependent feedback signal opo+ by a gate-source voltage ($V_{GSP}$) 56 of a PMOS transistor, and the drive signal gd− is lower than the output-dependent feedback signal opo− by a gate-source voltage ($V_{GSN}$) 78 of a NMOS transistor. In the charge phase Φ1, the drive signal gd+ is connected to the gate of the PMOS transistor 80, the drive signal gd− is connected to the gate of the NMOS transistor 84, the paths connecting the drive signal gd+ to the PMOS transistors 82 and 86 are cut off, the drive signals g7 and g8 are pulled high to VOUT to turn off the PMOS transistors 82 and 86, and the PMOS transistor 80 and the NMOS transistor 84 establish a charge path such that the power supply VIN connected to the input terminal 12 will charge the capacitor 40 and control the charge current. On the contrary, in the discharge phase Φ2, the drive signal gd+ controls the PMOS transistors 82 and 86, the PMOS transistor 80 and the NMOS transistor 84 are turned off, and the PMOS transistor 80 and the NMOS transistor 84 establish a discharge path such that the capacitor 40 will discharge to the output terminal 14 and control the discharge current.

Figure 10:
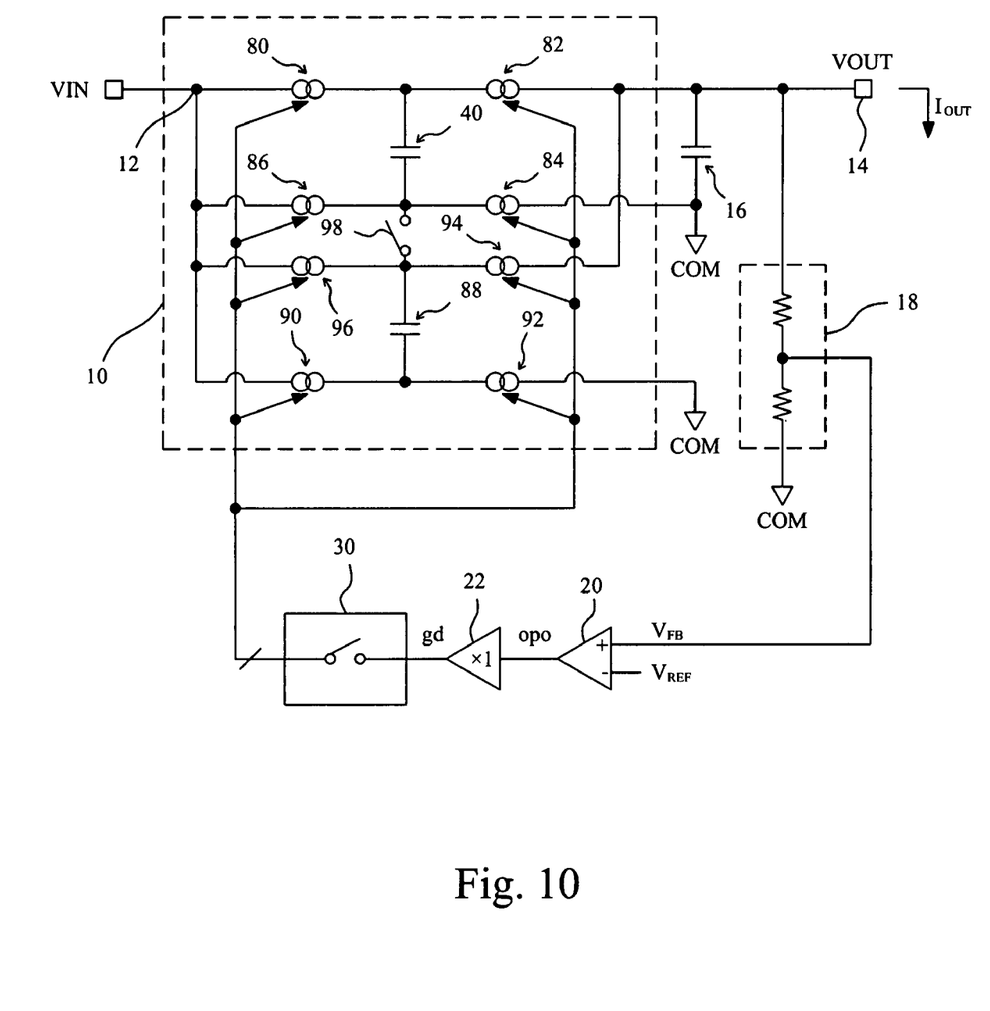
FIG. 10 shows a seventh embodiment according to the present invention.
Figure 11:
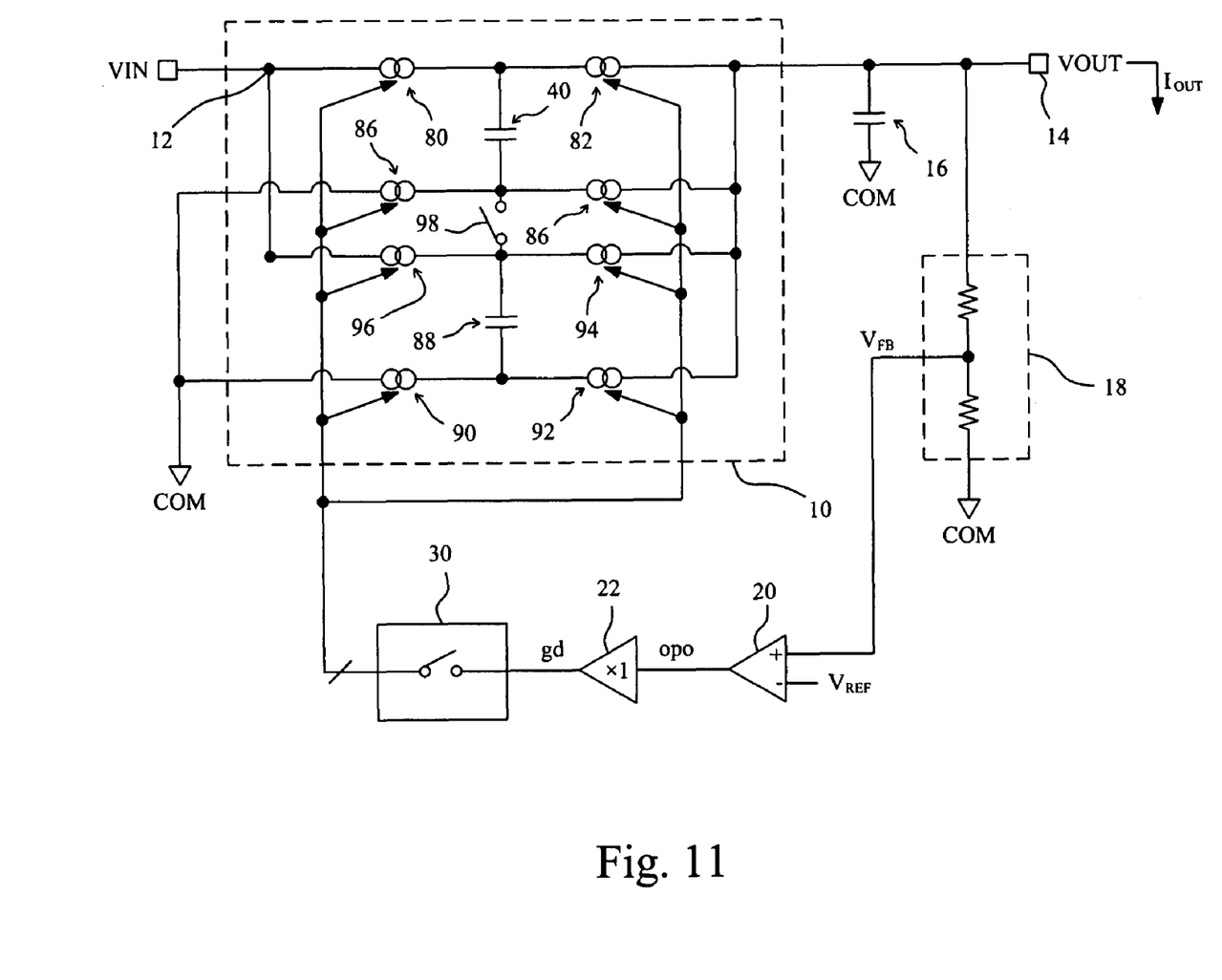
FIG. 11 shows an eighth embodiment according to the present invention.

According to different demands, circuits with different pump ratios may be employed for the charge pump 10. For example, FIG. 10 shows a $$x1/x\frac{2}{3}/x\frac{1}{2}/x\frac{1}{3}$$

boost-type charge pump regulator, which comprises eight voltage-controlled voltage sources 80, 82, 84, 86, 90, 92, 94 and 96, a switch 98, and two capacitors 40 and 88 configured to be a network connected between an input terminal 12 and an output terminal 14. The other circuits of this regulator are the same as those of the above embodiments, and they are operated in the same way as the above embodiments and so will not be reiterated herein. Changing the element configuration in the charge pump 10 will result in different types of charge pump regulators, for example a buck-type charge pump regulator is shown in FIG. 11, whose operations are referred to the above embodiments and so will not be reiterated herein. Various types of charge pumps with various pump ratios are well known by those skilled in the art, and they can follow the teaching of the present invention to change or modify the circuits according to actual demands.

As shown in the above embodiments, both of the current control element and the switch can be implemented with NMOS transistors, but the switch can operate between two states, i.e. on and off, whereas the current control element can operate in a linear region and control the current flowing therethrough according to the regulated voltage VOUT. Furthermore, controlling the charge current or the discharge current of the capacitor in the charge pump, the current control element can also replace a conventional switch, and therefore a charge pump regulator according to the present invention may have reduced input ripple and output ripple without adding any extra series resistors, resulting in higher efficiency and smaller chip size. The lower open loop resistance also improves the current-capacity of the charge pump regulator. Particularly, changing the element configuration in the charge pump may implement different types of charge pump regulators, such as boost-type, inverting boost-type and buck-type charge pump regulator, thereby increasing the flexibility of circuit design.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A charge pump regulator for regulating a voltage on an output terminal, comprising:
    an input terminal for connecting with a power supply;
    a charge pump connected between the input terminal and the output terminal, for being operative to establish a charge path and a discharge path alternately;
    a feedback loop for producing an output-dependent feedback signal, charge pump having at least a current control element on the charge path or the discharge path for controlling a current flowing therethrough according to a drive signal derived from the output-dependent feedback signal; and a connector for connecting the drive signal to the current control element and disconnecting the drive signal from the current control element, the connector including:
- a transmission gate for connecting the drive signal to the current control element in a first phase; and
- a switch for connecting a voltage to turn off the current control element in a second phase, the voltage to turn off the current control element being the regulated voltage on the output terminal.

2. The charge pump regulator of claim 1, wherein the charge pump is configured to be a boost-type charge pump.

3. The charge pump regulator of claim 1, wherein the feedback loop comprises:
- a voltage divider for producing a proportional voltage from the voltage on the output terminal; and
- an amplifier for amplifying a difference between the proportional voltage and a reference voltage to produce the output-dependent feedback signal.

4. The charge pump regulator of claim 1, further comprising a buffer for producing the drive signal from the output-dependent feedback signal.

5. The charge pump regulator of claim 4, wherein the buffer comprises:
- a current source; and
- a transistor serially connected to the current source and having a gate connected with the output-dependent feedback signal, for producing the drive signal.

6. The charge pump regulator of claim 1, wherein the current control element comprises a voltage-controlled voltage source operative to regulate its output in response to the drive signal.

7. The charge pump regulator of claim 6, wherein the voltage-controlled voltage source comprises a transistor operative in a linear region according to the drive signal.

8. The charge pump regulator of claim 1, wherein the current control element comprises a voltage-controlled current source operative to regulate its output in response to the drive signal.

9. The charge pump regulator of claim 8, wherein the voltage-controlled current source comprises a transistor operative in a linear region according to the drive signal.

10. The charge pump regulator of claim 1, further comprising a clock generator for producing multi-phase non-overlapping clocks for the connector, to control the connector to connect the drive signal to the current control element in a first phase and disconnect the drive signal from the current control element in a second phase.

11. The charge pump regulator of claim 1, further comprising a clock generator for producing multi-phase non-overlapping clocks for the charge pump to be switched between two phases corresponding to the charge path and the discharge path respectively.

* * * * *